(12) United States Patent
Wang et al.

(10) Patent No.: US 10,487,581 B2
(45) Date of Patent: Nov. 26, 2019

(54) INTERNAL LADDER ASSEMBLY FOR A WIND TURBINE ROTOR HUB

(71) Applicant: General Electric Company, Schenectady, NY (US)

(72) Inventors: Chengjie Wang, Shanghai (CN); Mohan Muthu Kumar Sivanantham, Bangalore (IN); Vidya Sagar Meesala, Rheine (DE)

(73) Assignee: General Electric Company, Schenectady, NY (US)

( * ) Notice: Subject to any disclaimer, the term of this patent is extended or adjusted under 35 U.S.C. 154(b) by 211 days.

(21) Appl. No.: 15/442,040

(22) Filed: Feb. 24, 2017

(65) Prior Publication Data

US 2017/0247945 A1    Aug. 31, 2017

(30) Foreign Application Priority Data

Feb. 29, 2016    (CN) .......................... 2016 1 0110419

(51) Int. Cl.
*E06C 9/02* (2006.01)
*F03D 1/00* (2006.01)
(Continued)

(52) U.S. Cl.
CPC .............. *E06C 9/02* (2013.01); *E02D 27/425* (2013.01); *E04H 12/08* (2013.01); *F03D 1/0691* (2013.01);
(Continued)

(58) Field of Classification Search
CPC .......... F03D 1/10; F03D 1/0691; F03D 80/50; F03D 80/00; E06C 9/00; E06C 9/02;
(Continued)

(56) References Cited

U.S. PATENT DOCUMENTS

| | | | |
|---|---|---|---|
| 2010/0129216 A1* | 5/2010 | Bagepalli | F03D 80/50 416/61 |
| 2012/0201693 A1* | 8/2012 | Pettersson | F03D 1/0658 416/244 R |

(Continued)

FOREIGN PATENT DOCUMENTS

| | | |
|---|---|---|
| CN | 202108674 U | 1/2012 |
| CN | 203129943 U | 8/2013 |
| DE | 202012006595 U1 | 8/2012 |

OTHER PUBLICATIONS

Extended European Search Report and Opinion issued in connection with corresponding EP Application No. 17157008.8 dated Jul. 18, 2017.

*Primary Examiner* — Daniel P Cahn
(74) *Attorney, Agent, or Firm* — Dority & Manning, P.A.

(57) ABSTRACT

A rotor hub for a wind turbine may generally include a hub body defining both a plurality of blade flanges and a plurality of access ports spaced apart from the blade flanges. In addition, the rotor hub may include a ladder assembly extending within an interior of the hub body. The ladder assembly may include a plurality of platforms, with each platform defining a planar surface and being circumferentially aligned with a respective one of the plurality of access ports. The ladder assembly may also include a connecting frame extending between each pair of adjacent platforms so as to couple the adjacent platforms to one another. The connecting frame may extend lengthwise along a reference line defined between the adjacent platforms. The platforms may be positioned relative to one another such that the reference line extends at a non-perpendicular angle relative to the planar surfaces defined by the adjacent platforms.

11 Claims, 8 Drawing Sheets

(51) Int. Cl.
*E02D 27/42* (2006.01)
*E04H 12/08* (2006.01)
*F03D 1/06* (2006.01)
*F03D 80/50* (2016.01)
*E04G 3/24* (2006.01)
*F03D 13/10* (2016.01)
*F03D 13/20* (2016.01)
*F03D 13/40* (2016.01)

(52) U.S. Cl.
CPC .............. *F03D 80/50* (2016.05); *E02D 27/42* (2013.01); *E04G 3/246* (2013.01); *F03D 13/10* (2016.05); *F03D 13/20* (2016.05); *F03D 13/40* (2016.05); *Y02E 10/721* (2013.01)

(58) Field of Classification Search
CPC ......... H02K 5/22; Y02E 10/721; E02D 27/42; E02D 27/425; E04G 3/246
See application file for complete search history.

(56) References Cited

U.S. PATENT DOCUMENTS

| | | | |
|---|---|---|---|
| 2012/0263602 A1* | 10/2012 | Booth | H02K 5/22 |
| | | | 416/244 R |
| 2013/0302175 A1 | 11/2013 | Munk-Hansen | |
| 2013/0334819 A1* | 12/2013 | Fricke | F03D 1/0691 |
| | | | 290/44 |
| 2014/0050591 A1 | 2/2014 | Munk-Hansen | |
| 2015/0023794 A1 | 1/2015 | Ebbesen et al. | |
| 2015/0078914 A1* | 3/2015 | Ebbesen | F03D 1/0691 |
| | | | 416/244 A |
| 2015/0354233 A1 | 12/2015 | Ebbesen et al. | |

\* cited by examiner

INTERNAL LADDER ASSEMBLY FOR A WIND TURBINE ROTOR HUB

CROSS-REFERENCE TO RELATED APPLICATIONS

This application is based upon and claims the right of priority to Chinese Application No. 201610110419.1, filed on Feb. 29, 2016, the disclosure of which is hereby incorporated by reference herein in its entirety for all purposes.

FIELD OF THE INVENTION

The present subject matter relates generally to wind turbines and, more particularly, to an internal ladder assembly for a wind turbine rotor hub that allows service personnel to access the interior of the rotor hub through rear access ports defined through the hub.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, rotor hub and one or more rotor blades. The rotor blades capture kinetic energy of the wind using known airfoil principles. The rotor blades transmit the kinetic energy in the form of rotational energy to turn a shaft coupling the rotor blades to a gearbox, or if a gearbox is not used, directly to the generator. The generator then converts the mechanical energy to electrical energy that may be deployed to a utility grid.

In order to perform certain types of maintenance on the rotor hub, the rotor blades and/or various other components of the wind turbine, a service worker must gain internal access to the rotor hub. Typically, such access is gained through an access port located at the front end of the rotor hub (i.e., the end of the rotor hub furthest away from the nacelle). Thus, to reach the access port, a service worker must typically climb onto the top of the nacelle, move over to the top of the rotor hub and repel or climb down the front of the rotor hub. Unfortunately, since the service worker must climb outside the wind turbine and over the top of the rotor hub, significant safety risks are associated with gaining access to the interior of the hub.

Accordingly, a rotor hub and associated internal ladder assembly that allow a service worker to safely and efficiently gain access to the interior of the hub would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a rotor hub for a wind turbine. The rotor hub may generally include a hub body extending between a forward end and an aft end. The hub body may define a plurality of blade flanges between the forward and aft ends. The hub body may also define a plurality of access ports spaced apart from the blade flanges. In addition, the rotor hub may include a ladder assembly extending within an interior of the hub body. The ladder assembly may include a plurality of platforms, with each platform being positioned within the interior of the rotor hub so as to be circumferentially aligned with a respective one of the plurality of access ports. Each platform may also define a planar surface. The ladder assembly may further include a connecting frame extending between each pair of adjacent platforms so as to couple the adjacent platforms to one another. The connecting frame may extend lengthwise along a reference line defined between the adjacent platforms. The platforms may be positioned relative to one another such that the reference line extends at a non-perpendicular angle relative to the planar surfaces defined by the adjacent platforms.

In another aspect, the present subject matter is directed to an internal ladder assembly for a rotor hub of a wind turbine. The ladder assembly may generally include a plurality of platforms spaced apart circumferentially from one another. Each platform may define a planar surface extending lengthwise between a first end and a second end. The platforms may include a first platform, a second platform and a third platform. The ladder assembly may also include at least one first frame member extending outwardly from the first platform, at least one second frame member extending outwardly from the second platform and at least one third frame member extending outwardly from the third platform. Each of the first, second and third frame members may be oriented at a non-perpendicular angle relative to the planar surface defined by the respective platform from which the first, second or third frame members extends.

In a further aspect, the present subject matter is directed to a rotor hub for a wind turbine. The rotor hub may generally include a hub body extending between a forward end and an aft end. The hub body may define a plurality of blade flanges between the forward and aft ends. The hub body may also define a plurality of access ports spaced apart from the blade flanges. In addition, the rotor hub may include a ladder assembly extending within an interior of the hub body. The ladder assembly may include a plurality of ladder sub-assemblies, with each ladder sub-assembly being positioned at least partially within the interior of the rotor hub so as to be circumferentially aligned with a respective one of the plurality of access ports. Each ladder sub-assembly may include a first ladder support, a second ladder support and at least one ladder rung extending between the first and second ladder supports. The ladder assembly may also include a connecting frame extending between each pair of adjacent ladder sub-assemblies so as to couple the adjacent ladder sub-assemblies to one another. The connecting frame may extend lengthwise along a reference line defined between the adjacent ladder sub-assemblies. In addition, the ladder assembly may include at least one foot support member extending from the connecting frame.

Embodiment 1. A rotor hub for a wind turbine, the rotor hub comprising:

a hub body extending between a forward end and an aft end, the hub body defining a plurality of blade flanges between the forward and aft ends, the hub body further defining a plurality of access ports spaced apart from the blade flanges; and a ladder assembly extending within an interior of the hub body, the ladder assembly comprising:

a plurality of platforms, each platform being positioned within the interior of the rotor hub so as to be circumferentially aligned with a respective one of the plurality of access ports, each platform defining a planar surface; and a connecting frame extending between each pair of adjacent platforms so as to couple the adjacent platforms to one another, the connecting frame extending lengthwise along a reference line defined between the adjacent platforms, wherein the platforms are positioned relative to one another such that the reference line extends at a non-perpendicular angle relative to the planar surfaces defined by the adjacent platforms.

Embodiment 2. The rotor hub of Embodiment 1, wherein the non-perpendicular angle corresponds to an obtuse interior angle defined between the reference line and the planar surfaces of the adjacent platforms along an interior of the ladder assembly.

Embodiment 3. The rotor hub of Embodiment 2, wherein each blade flange of the hub body defines a planar mounting surface for coupling a rotor blade of the wind turbine to the rotor hub, wherein the reference line extends parallel to the planar mounting surface defined by an adjacent blade flange of the plurality of blade flanges.

Embodiment 4. The rotor hub of Embodiment 1, wherein the ladder assembly further comprises first and second ladder supports extending outwardly from each platform towards the respective one of the plurality of access ports.

Embodiment 5. The rotor hub of Embodiment 4, wherein the ladder assembly further comprises at least one ladder rung extending between the first and second ladder supports.

Embodiment 6. The rotor hub of Embodiment 1, wherein the ladder assembly further comprises at least one foot support member extending from the connecting frame.

Embodiment 7. The rotor hub of Embodiment 1, wherein the connecting frame includes a first frame member and a second frame member, the first frame member extending outwardly from a first platform of the adjacent platforms along the reference line, the second frame member extending outwardly from a second platform of the adjacent platforms along the reference line.

Embodiment 8. The rotor hub of Embodiment 7, wherein the first and second frame members are coupled to one another via an intermediate frame member extending between the first and second frame members along the reference line.

Embodiment 9. The rotor hub of Embodiment 1, wherein the planar surface is oriented generally perpendicular to a centerline of the respective one of the plurality of access ports.

Embodiment 10. An internal ladder assembly for a rotor hub of a wind turbine, the ladder assembly comprising:

a plurality of platforms spaced apart circumferentially from one another, each platform defining a planar surface extending lengthwise between a first end and a second end, the plurality of platforms including a first platform, a second platform and a third platform;

at least one first frame member extending outwardly from the first platform;

at least one second frame member extending outwardly from the second platform; and at least one third frame member extending outwardly from the third platform, wherein each of the at least one first, second and third frame members is oriented at a non-perpendicular angle relative to the planar surface defined by the respective platform from which each of the at least one first, second and third frame members extends.

Embodiment 11. The ladder assembly of Embodiment 10, wherein the non-perpendicular angle corresponds to an obtuse interior angle defined between each of the at least one first, second and third frame members and the planar surface defined by the respective platform from which each of the at least one first, second and third frame members extends.

Embodiment 12. The ladder assembly of Embodiment 10, further comprising first and second ladder supports extending radially outwardly from each of the plurality of platforms and a ladder rung extending between the first and second ladder supports.

Embodiment 13. The ladder assembly of Embodiment 10, further comprising at least one foot support member extending from each of the at least one of the first, second and third frame members.

Embodiment 14. The ladder assembly of Embodiment 10, wherein each of the at least one first, second and third frame members includes a first outer frame member extending outwardly from the first end of its respective platform and a second outer frame member extending outwardly from the second end of its respective platform, the first outer frame member of each of the at least one first, second and third frame members being coupled to the second outer frame member of another of the at least one of the first, second and third frame members around an outer perimeter of the ladder assembly.

Embodiment 15. A rotor hub for a wind turbine, the rotor hub comprising:

a hub body extending between a forward end and an aft end, the hub body defining a plurality of blade flanges between the forward and aft ends, the hub body further defining a plurality of access ports spaced apart from the blade flanges; and a ladder assembly extending within an interior of the hub body, the ladder assembly comprising:

a plurality of ladder sub-assemblies, each ladder sub-assembly being positioned at least partially within the interior of the rotor hub so as to be circumferentially aligned with a respective one of the plurality of access ports, each ladder sub-assembly including a first ladder support, a second ladder support and at least one ladder rung extending between the first and second ladder supports;

a connecting frame extending between each pair of adjacent ladder sub-assemblies so as to couple the adjacent ladder sub-assemblies to one another, the connecting frame extending lengthwise along a reference line defined between the adjacent ladder sub-assemblies; and at least one foot support member extending from the connecting frame.

Embodiment 16. The rotor hub of Embodiment 15, wherein the at least one foot support member extends inwardly from the connecting frame towards an interior of the ladder assembly.

Embodiment 17. The rotor hub of Embodiment 15, wherein the at least one foot support member extends outwardly from the connecting frame towards an exterior of the ladder assembly.

Embodiment 18. The rotor hub of Embodiment 15, wherein the at least one foot support member extends outwardly from the connecting frame such that a closed shape is defined between the at least one foot support member and the connecting frame.

Embodiment 19. The rotor hub of Embodiment 15, wherein each ladder sub-assembly further comprises a platform defining a planar surface, the first and second ladder supports extending outwardly from the platform.

Embodiment 20. The rotor hub of Embodiment 19, wherein the ladder sub-assemblies are positioned relative to one another such that the reference line extends at a non-perpendicular angle relative to the planar surfaces defined by the platforms of the adjacent ladder sub-assemblies.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
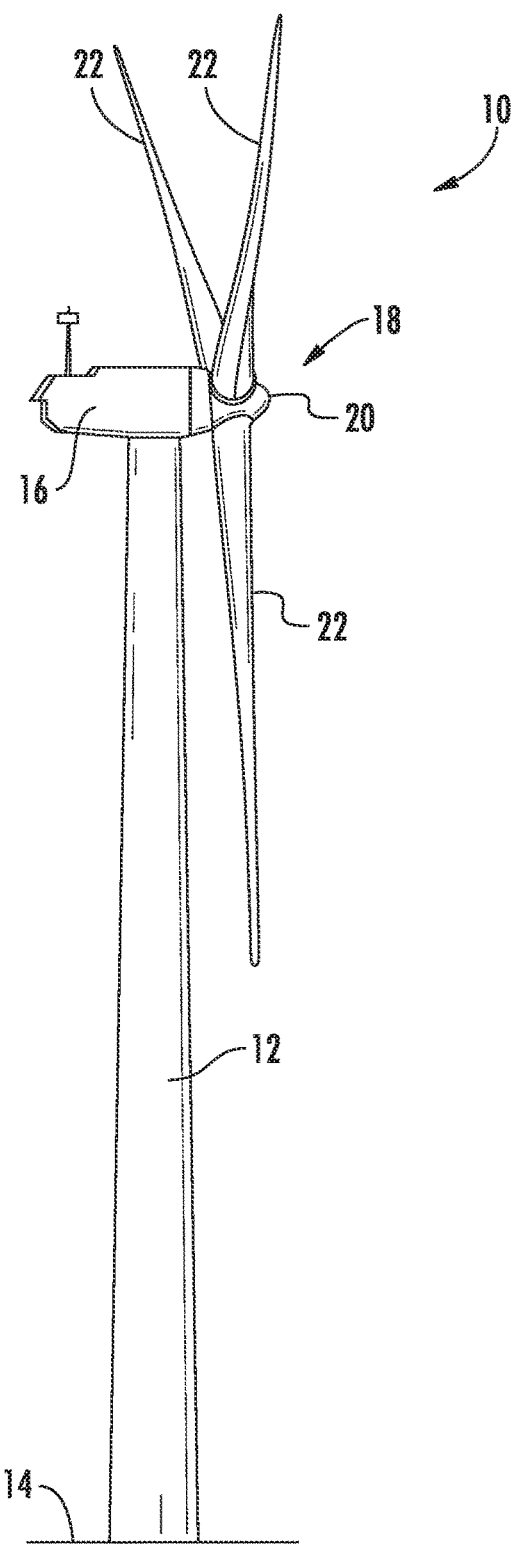
FIG. 1 illustrates a perspective view of one embodiment of a wind turbine.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a rotor hub for a wind turbine having an internal ladder assembly installed therein for allowing service personnel to quickly and easily gain access to the interior of the hub. Specifically, in several embodiments, the ladder assembly may include a plurality of ladder sub-assemblies mounted within the hub, with each ladder sub-assembly being circumferentially aligned with a different access port defined through the body of the hub. For example, as will be described below, the rotor hub may include three access ports spaced apart circumferentially from one another (e.g., by 120 degrees). In such an embodiment, the ladder assembly may include three ladder sub-assemblies such that each sub-assembly is mounted within the hub adjacent to the location of one of the access ports.

Additionally, in several embodiments, the ladder assembly may also include a plurality of connecting frames, with each connecting frame being coupled between an adjacent pair of ladder sub-assemblies such that the sub-assemblies are coupled to one another within the interior of the hub. The connecting frames may also be configured to form steps between each adjacent pair of ladder sub-assemblies. As such, to initially gain access to the interior of the rotor hub, the hub may be rotated such that one of the access ports is vertically oriented, thereby allowing a service worker to insert his/her legs through the access port from a top side of the hub and support himself/herself on the ladder sub-assembly positioned directly adjacent to such access port. The service worker may then utilize the step(s) formed by the connecting frames extending from the ladder sub-assembly on which he/she is standing to climb down into the hub.

As will be described below, each ladder sub-assembly may include a standing/stepping platform. In several embodiments, the platforms of the sub-assemblies may be positioned within the hub relative to one another such that each connecting frame extends between adjacent platforms at a non-perpendicular angle relative to the planar surfaces defined by the adjacent platforms. For instance, the connecting frames coupled to a given ladder sub-assembly may extend from its corresponding platform at an obtuse angle such that the connecting frames diverge outwardly as they extend away from the platform. Specifically, in a particular embodiment of the present subject matter, the platforms may be positioned within the hub relative to one another such that each connecting frame extends lengthwise between each pair of adjacent platforms along a reference line that is oriented parallel to an adjacent blade flange of the hub. By providing such a configuration, the internal area defined by the inner perimeter of the ladder assembly may provide a significant storage space or pass-through area for equipment and/or other wind turbine components.

Referring now to drawings, FIG. 1 illustrates a side view of one embodiment of a wind turbine 10. As shown, the wind turbine 10 generally includes a tower 12 extending from a support surface 14 (e.g., the ground, a concrete pad or any other suitable support surface). In addition, the wind turbine 10 may also include a nacelle 16 mounted on the tower 12 and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator (not shown) positioned within the nacelle 16 to permit electrical energy to be produced.

Figure 2:
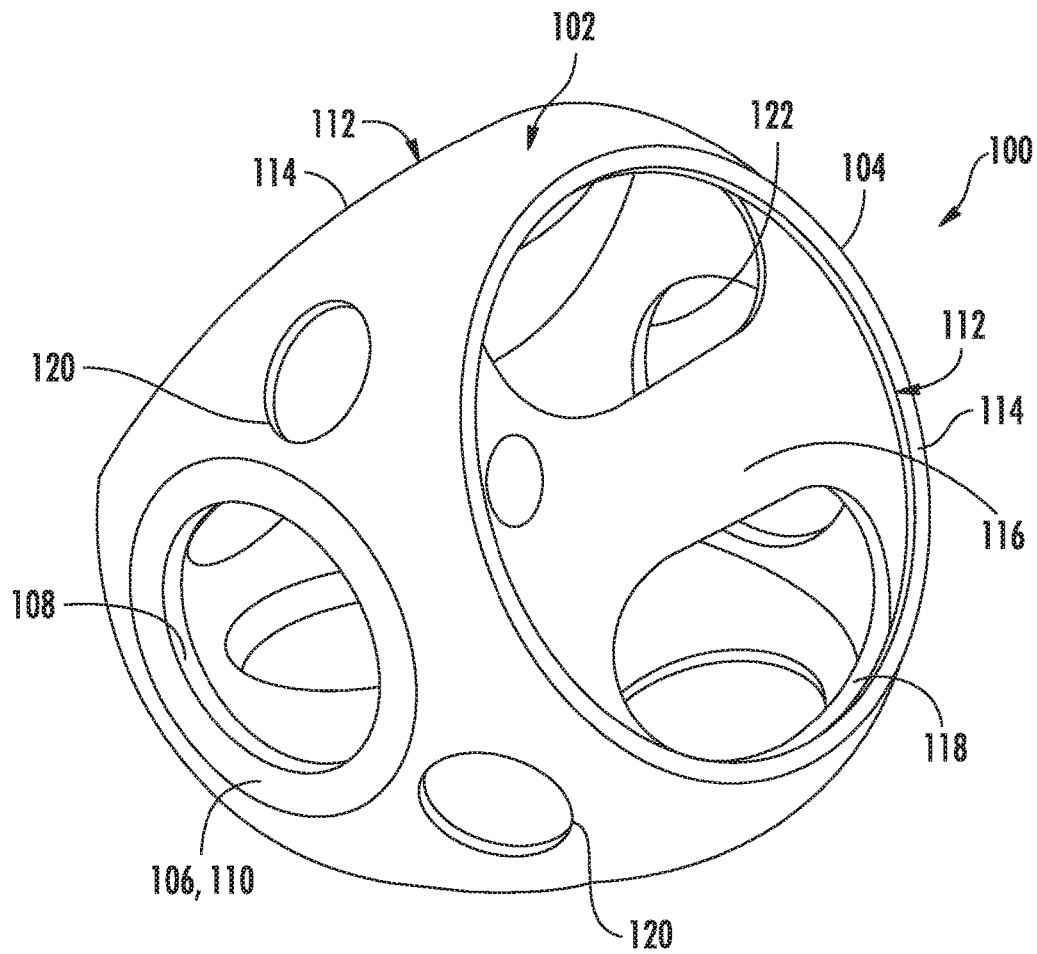
FIG. 2 illustrates a perspective view of one embodiment of a rotor hub that may be utilized with the wind turbine shown in FIG. 1 in accordance with aspects of the present subject matter.

Referring now to FIG. 2, a perspective view of one embodiment of a rotor hub 100 that may be utilized with the wind turbine 10 shown in FIG. 1 is illustrated in accordance with aspects of the present subject matter. In general, the rotor hub 100 may have any suitable configuration that allows the hub 100 to couple the rotor blades 22 of the wind turbine 10 to a corresponding rotor shaft (not shown) of the turbine 10. For example, the rotor hub 100 may include a hollow body 102 extending axially between a first end 104 and a second end 106. The first end 104 may generally correspond to the forward end of the rotor hub 100 (i.e., the end furthest away from the nacelle 16 when the rotor hub 100 is disposed in its assembled position on a wind turbine 10) and the second end 106 may generally correspond to the aft end of the rotor hub 100 (i.e., the end closest to the nacelle 16 when the rotor hub 100 is disposed in its assembled position on a wind turbine 10). As shown in FIG. 2, a shaft opening 108 may be defined at the second end 106 of the hub body 102. As is generally understood, when the wind turbine 10 is assembled, a portion of the rotor shaft (not shown) of the wind turbine 10 may be coupled to the hub 100 at the shaft opening 108 (e.g., by coupling the rotor shaft to a shaft flange 110 defined around the outer perimeter of the shaft opening 108) to facilitate rotatably mounting the hub 100 to the shaft.

Additionally, the rotor hub 100 may also include a plurality of blade flanges 112 spaced apart around its outer perimeter. In general, the number of blade flanges 112 may correspond to the number of rotor blades 22 of the wind turbine 10. For instance, in several embodiments, the rotor hub 100 may include three blade flanges 112, with each blade flange 112 being generally equally spaced apart circumferentially from adjacent blade flanges (e.g., by approximately 120 degrees). Each blade flange 112 may generally be configured to be coupled to one of the rotor blades 22 via a pitch bearing (not shown) of the wind turbine 10. For example, in several embodiments, each blade flange 112 may define a generally planar mounting surface 114 to which a suitable pitch bearing may be secured (e.g., using bolts and/or any other suitable fastening mechanisms). In addition, the rotor hub 100 may also include one or more stiffening webs 116 extending across an opening 118 defined by each blade flange 112. As is generally understood, the stiffening web(s) 116 may be configured to increase the structural stiffness and rigidity of the rotor hub 100 at and/or adjacent to each blade flange 112.

Moreover, as shown in FIG. 2, one or more hub access ports 120 may also be defined in the hub body 102. For instance, in several embodiments, three access ports 120 (two of which are shown in FIG. 2) may be defined in the hub body 102 at a location adjacent to the aft or second end 116 of the hub 100, such as by positioning the access ports 120 at an axial location generally between the shaft opening 108 and the blade flanges 112. In such an embodiment, the access ports 120 may be spaced apart around the outer perimeter of the hub body 102 so as to have any suitable circumferential spacing, such as by spacing the access ports 120 apart from one another equally (e.g., by approximately 120 degrees). For instance, in the illustrated embodiment, the access ports 120 are equally spaced from one another and generally circumferentially offset from the blade flanges 112 such that the center of each access port 120 is spaced apart circumferentially from the centers of the adjacent blade flanges 112 by approximately 60 degrees. As will be described in greater detail below, the hub access ports 120 may generally be configured to permit a service worker to gain access to the interior of the rotor hub 100. Thus, it should be appreciated the access ports 120 may be sized such that a person may travel through each access port 120.

Additionally, in one embodiment, a front access port 122 may also be defined at the forward or first end 104 of the rotor hub 100. Although the present subject matter will generally be described herein with reference to accessing the interior of rotor hub 100 through the access ports 120 defined near the aft or second end 106 of the hub 100, the front access port 122 may also be utilized to gain access to the interior of the rotor hub 100. For example, in several embodiments, the front access port 122 may be utilized to receive and/or remove heavy or large components from the hub 100 and/or to provide emergency access to the interior of the hub 100.

It should be appreciated that, in several embodiments, the hollow body 102 of the rotor hub 100 may be formed as a single component, such as by casting the body 102 using any suitable casting process and material. However, in other embodiments, the body 102 of the rotor hub 100 may be formed from a plurality of components, such as by forming the body 102 as a plurality of hub segments configured to be assembled together to form the overall shape and configuration of the rotor hub 100.

Figure 3:
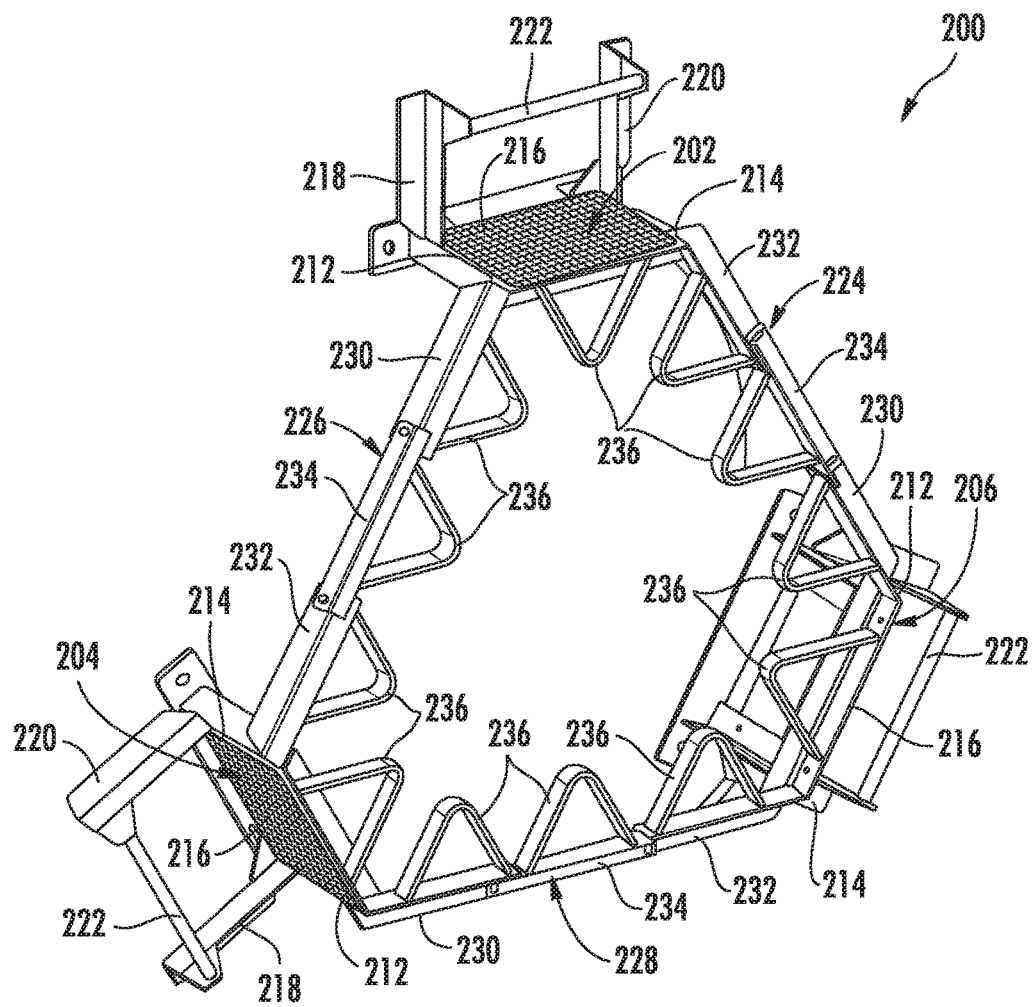
FIG. 3 illustrates a perspective, assembled view of one embodiment of a ladder assembly that may be installed within a rotor hub in accordance with aspects of the present subject matter.
Figure 4:
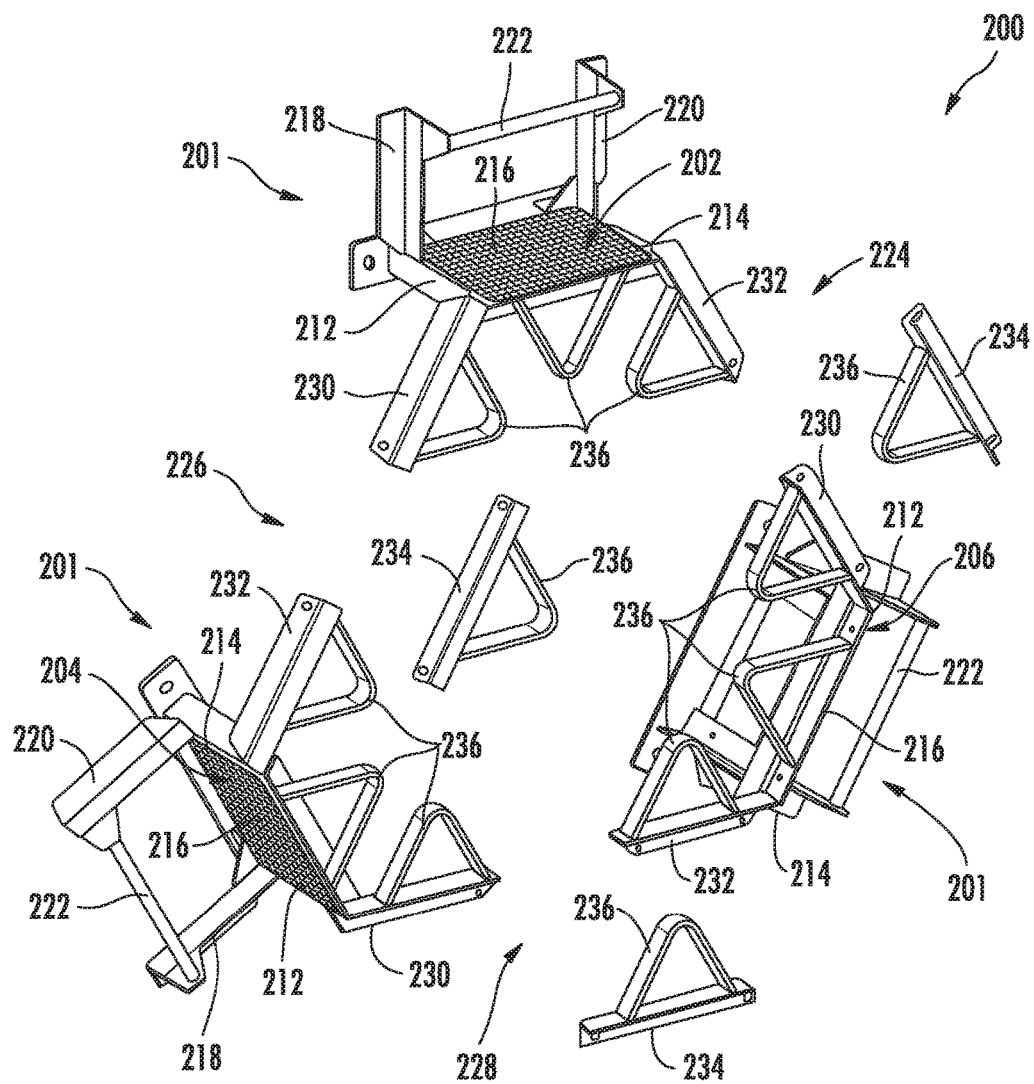
FIG. 4 illustrates a perspective, exploded view of the ladder assembly shown in FIG. 3.
Figure 5:
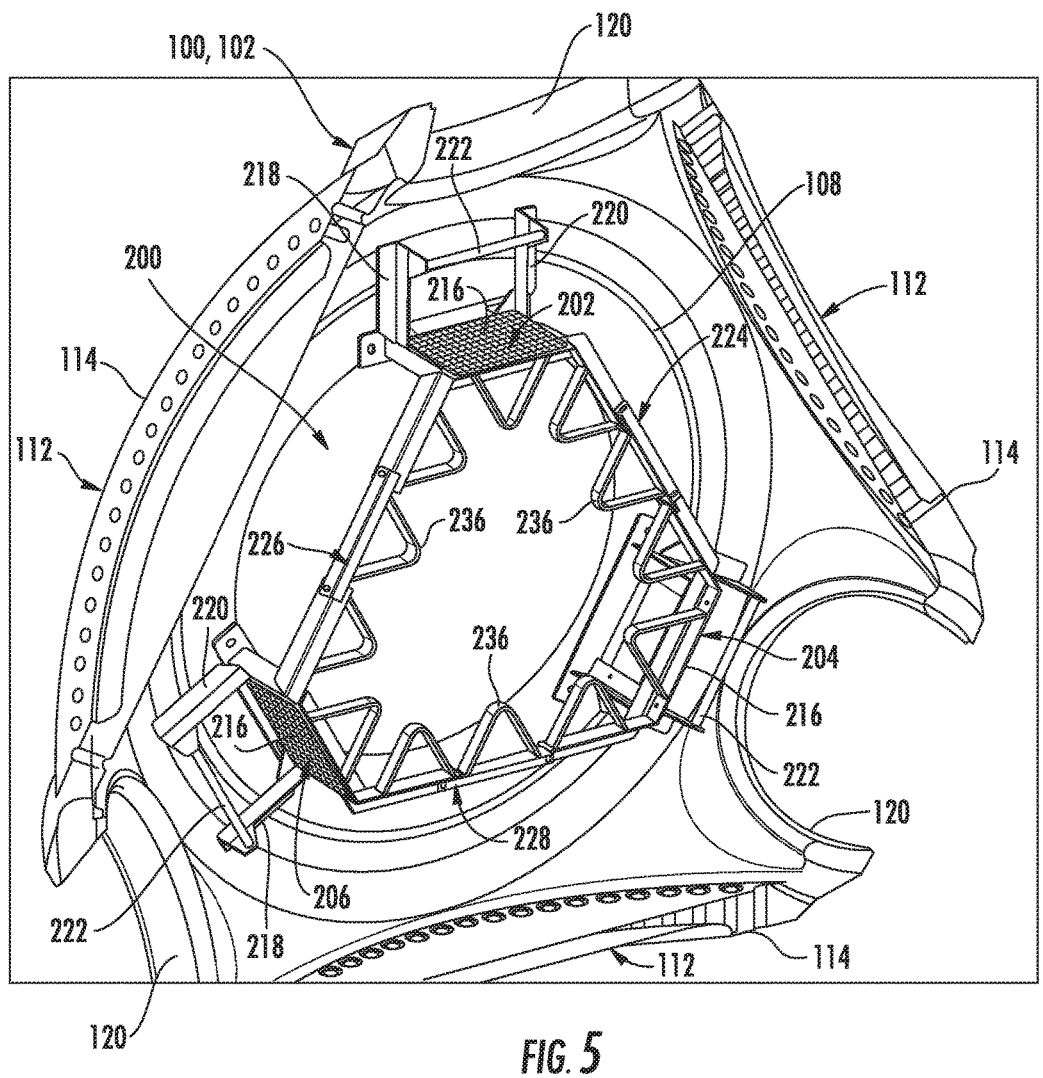
FIG. 5 illustrates a perspective, internal view of the rotor hub shown in FIG. 2 with the ladder assembly shown in FIGS. 3 and 4 installed therein, particularly illustrating a portion of the hub being cut-away for purposes of illustration.
Figure 6:
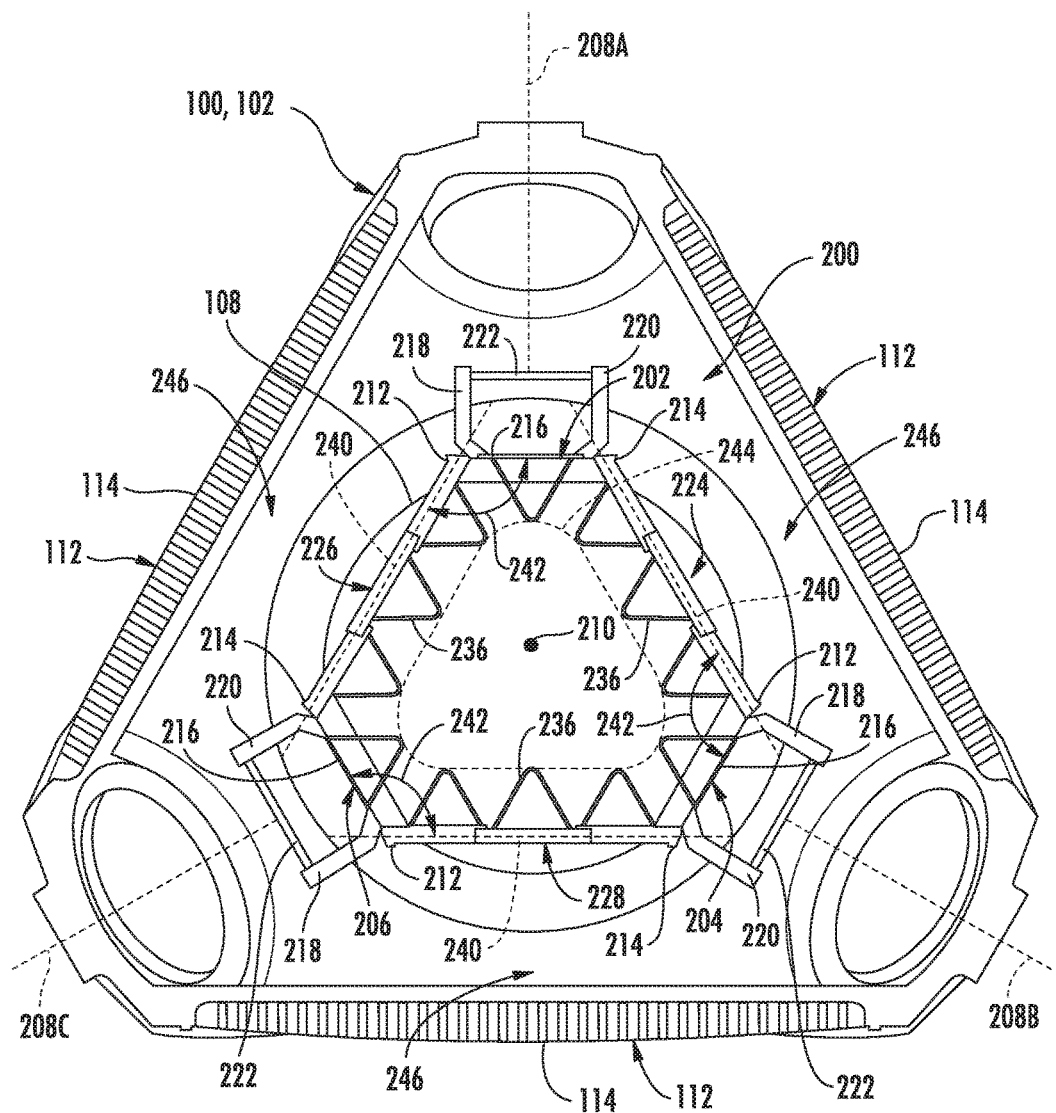
FIG. 6 illustrates a front-to-back axial view of the rotor hub and ladder assembly shown in FIG. 5.

Referring now to FIGS. 3-6, several views of one embodiment of a ladder assembly 200 that may be installed within a rotor hub of a wind turbine 10 to assist service personnel in gaining access to the interior of the hub 100 are illustrated in accordance with aspects of the present subject matter. Specifically, FIG. 3 illustrates a perspective, assembled view of the ladder assembly 200 and FIG. 4 illustrates a perspective, exploded view of the ladder assembly 200 shown in FIG. 3. FIG. 5 illustrates a perspective, internal view of the rotor hub 100 shown in FIG. 2 with the ladder assembly 200 shown in FIGS. 3 and 4 installed therein, particularly illustrating a portion of the hub 100 being cut-away for purposes of illustration. Additionally, FIG. 6 illustrates front-to-back axial view of the rotor hub 100 and the ladder assembly 200 shown in FIG. 5.

In general, the ladder assembly 200 may be configured to be installed within the interior of the rotor hub 100 such that service personnel accessing the hub 100 through one of the access ports 120 may climb down into the hub 100 both safely and efficiently. For instance, the hub 100 may be rotated relative to the nacelle 16 of the wind turbine 10 such that one of the access ports 120 is positioned at the twelve o'clock rotor position (e.g., similar to the access port 120 shown at the top of FIG. 6). Given that the access ports 120 are positioned adjacent to the aft or second side 106 of the hub 100, a service worker located on the nacelle 16 may access the interior of the hub 100 via the access port 120 positioned at the twelve o'clock rotor position. The service worker may then utilize the internal ladder assembly 200 to climb down into the hub.

As particularly shown in FIGS. 2 and 3, the ladder assembly 200 may, in several embodiments, include a plurality of platforms 202, 204, 206 configured to provide a stable standing/stepping surface for service personnel initially entering the rotor hub 100 via one of the access ports 120. Specifically, in embodiments in which the rotor hub 100 includes three access ports 120 (e.g., a first access port 120A, a second access port 120B and a third access port 120C as shown in FIG. 6), the ladder assembly 200 may similarly include three standing/stepping platforms 202, 204, 206, with each platform configured to be positioned within the hub 100 so as to be circumferentially aligned with one of the access ports 120. For example, as shown in FIG. 6, a first platform 202 of the ladder assembly 200 may be installed within the rotor hub 100 so as to be circumferentially aligned with the first access port 120A, such as by aligning the platform 202 with a centerline 208A of the first access port 120A. Similarly, second and third platforms 204, 206 of the ladder assembly 200 may be installed within the rotor hub 100 so as to be circumferentially aligned with the second and third access ports 120B, 120C, respectively, such as aligning the platforms 204, 206 with respective centerlines 208B, 208C of the corresponding access ports 120B, 120C. For instance, in one embodiment, a center of each platform 202, 204, 206 may be circumferentially aligned with the centerline 208A, 208B, 208C of its corresponding access port 120A, 120B, 120C. As such, in embodiments in which the access ports 120A, 120B, 120C are spaced apart circumferentially from one another by 120 degrees, the centers of the platforms 202, 204, 206 may be similarly spaced apart circumferentially from one another by 120 degrees within the interior of the rotor hub 102.

Additionally, the platforms 202, 204, 206 may be positioned radially outwardly from a rotational axis 210 (FIG. 6) of the hub 100 such that each platform 202, 204, 206 may be easily accessed from its corresponding access port 120A, 120B, 120C. For instance, as shown in FIG. 6, the platforms 202, 204, 206 are generally radially aligned with the outer perimeter of the shaft opening 108. As such, a service worker entering the hub 100 through one of the access ports 120 may immediately place his/her foot onto the adjacent platform 202, 204, 206 to assist the worker in climbing down into the hub 100. For instance, prior to entering the hub 100, the service worker may have a safety cable coupled to the nacelle 16. However, as the service worker enters the hub 100, it may be desirable for the hooking point of the safety cable to be moved to a location within the interior of the hub 100. By providing an easily accessible platform 202, 204, 206 adjacent to the access port 120 being used to enter the hub 100, the service worker may safely stand on the platform 202, 204, 206 as he/she moves the hooking point of the safety cable.

As shown in the illustrated embodiment, each platform 202, 204, 206 may generally extend lengthwise between a first end 212 and a second end 214. In addition, each platform 202, 204, 206 may define a planar surface 216 extending between its first and second ends 212, 214. As particularly shown in FIG. 6, in one embodiment, the platforms 202, 204, 206 may be oriented relative to the access ports 120A, 120B, 120C such that the planar surface 216 defined by each platform 202, 204, 206 extends generally perpendicular to the centerline 208A, 208B, 208C of its corresponding access port 120A, 120B, 120C.

Moreover, as shown in the illustrated embodiment, the ladder assembly 200 may also include first and second ladder supports 218, 220 extending outwardly from each platform 202, 204, 206 in the direction of the adjacent access port 120A, 120B, 120C. Each pair of ladder supports 218, 220 may be configured to support one or more ladder rungs 222 at a radial location between the adjacent platform 202, 204, 206 and its corresponding access port 120A, 120B, 120C. For example, as shown in FIG. 6, each ladder rung 222 may extend perpendicularly between its corresponding ladder supports 218. 220 (and parallel to the planar surface 216 of the adjacent platform 202, 204, 206) such that the ladder rung 222 forms a stepping surface between each access port 120A, 120B, 120C and the corresponding platform 202, 204, 206. As such, a service worker entering the hub 100 through one of the access ports 120A, 120B, 120C may place his/her foot initially onto the adjacent ladder rung 222 prior to stepping down onto the corresponding platform 202, 204, 206. It should be appreciated that, although the illustrated ladder assembly 200 is shown as including a single ladder rung 222 disposed between each pair of ladder supports 218, 220, the ladder assembly 200 may, instead, include two or more ladder rungs 222 extending between each pair of ladder supports 218, 220. For instance, the ladder assembly 200 may include a plurality of radially spaced ladder rungs 222 extending between each pair of ladder supports 218, 220.

It should be appreciated that, in several embodiments, each platform 202, 204, 206 and its corresponding ladder supports 218, 220 and ladder rung(s) 220 may form all or part of a ladder sub-assembly 201 of the ladder assembly 200. For example, as shown in FIG. 4, the ladder assembly 200 may include three ladder sub-assemblies 201 configured to be installed within the interior of the hub 100. As will be described below, in particular embodiments, the ladder sub-assemblies 201 may be configured to be coupled to one another within the interior of the hub 100 to form a closed-shaped structure or assembly. Alternatively, the ladder sub-assemblies 201 may be mounted separately within the interior of the hub 100 without being coupled to one another.

Referring still to FIGS. 3-6, the ladder assembly 200 may also include a connecting frame 224, 226, 228 extending between each pair of adjacent platforms 202, 204, 206 in order to couple the platforms 202, 204, 206 (and, thus, the ladder sub-assemblies 201) to one another within the interior of the hub 100. For example, as shown in the illustrated embodiment, the ladder assembly 200 includes a first connecting frame 224 coupled between the second end 214 of the first platform 202 and the first end 212 of the second platform 204. Additionally, the ladder assembly 200 includes a second connecting frame 226 coupled between the first end 212 of the first platform 202 and the second end 214 of the third platform 26 and a third connecting frame 228 coupled between the second end 214 of the second platform 204 and the first end 212 of the third platform 206. As such, when coupled together, the connecting frames 224, 226, 228 and the platforms 202, 204, 206 may form a closed-shaped structure or assembly.

In several embodiments, each connecting frame 224, 226, 228 may be formed by one or more frame members coupled to one another along the length of the connecting frame 224, 226, 228. For example, as particularly shown in FIGS. 3 and 4, a first outer frame member 230 is configured to extend outwardly from the first end 212 of each platform 224, 226, 228 and a second outer frame member 232 is configured to extend outwardly from the second end 214 of each platform 224, 226, 228. Additionally, the ladder assembly 200 may include an intermediate frame member 234 configured to be coupled between the first outer frame member 230 of each stepping platform 202, 204, 206 and the second outer frame member 232 of the adjacent stepping platform 202, 204, 206. As such, by coupling each intermediate frame member 234 between its corresponding outer frame members 230, 232, a connecting frame 224, 226, 228 may be formed that extends between the adjacent platforms 202, 204, 206 to form the closed-shape structure of the ladder assembly 100.

It should be appreciated that, in other embodiments, each connecting frame 224, 226, 228 may be formed from any other suitable number of frame members. For instance, each connecting frame 224, 226, 228 may be formed by a single frame member extending directly between the ends 212, 214 of adjacent stepping platforms 202, 204, 206. Alternatively, the frame members 230, 232 extending from each platform 202, 204, 206 may be coupled directly to the frame members 230, 232 of adjacent platforms 202, 204, 206 without the need for the intermediate frame members 234.

Additionally, in several embodiments, each connecting frame 224, 226, 228 may include one or more foot support members 236 extending from the frame member(s) 230, 232, 234. For example, as shown in the illustrated embodiment, each frame member 230, 232, 234 may include a foot support member 236 extending inwardly therefrom towards the center of the ladder assembly 200. Moreover, as shown in the illustrated embodiment, each platform 202, 204, 206 may similarly include a foot support member 236 extending inwardly therefrom towards the center of the ladder assembly 200. The various foot support members 236 may be configured to serve as steps extending along the interior of the ladder assembly 200. As such, a service worker standing on one of the platforms 202, 204, 206 may step down onto one or more of the foot support members 236 as he/she climbs down into the rotor hub 100.

Figure 7:
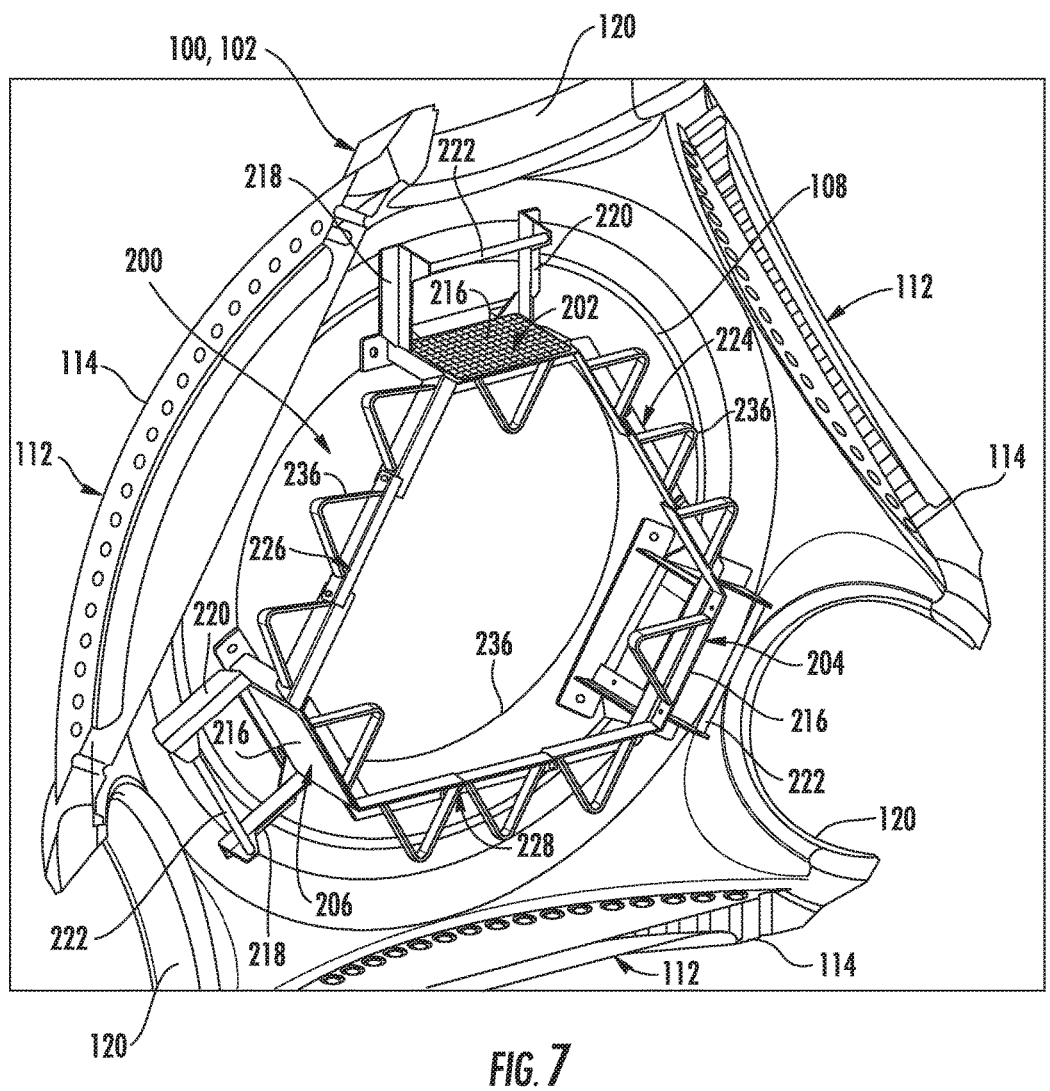
FIG. 7 illustrates a perspective, internal view of the rotor hub shown in FIG. 2 with another embodiment of a ladder assembly installed therein in accordance with aspects of the present subject matter, particularly illustrating the ladder assembly including foot support members extending radially outwardly from the assembly's connecting frames.

In alternative embodiments, the foot support members 236 may be configured to extend outwardly from the frame member(s) 230, 232, 234. For example, FIG. 7 illustrates an alternative embodiment of the ladder assembly 200 shown in FIG. 5 in which the foot support members 236 extend outwardly from the frame member(s) 230, 232, 234 toward the exterior of the ladder assembly 200. In a further embodiment, the ladder assembly 200 may include foot support members 236 extending both inwardly and outwardly from the frame member(s) 230, 232, 234.

Additionally, as shown in the illustrated embodiment, each foot support member 236 may be configured to extend from its corresponding frame member 230, 232, 234 so as to define a closed-shape between the foot support member 236 and the adjacent frame member 230, 232, 234. As such, a service worker may place his/her foot within the interior of the closed-shape defined between each foot support member 236 and its corresponding frame member 230, 232, 234 when climbing down into the hub 100. As shown in the illustrated embodiment, each foot support member 236 is generally V-shaped such that a triangular closed-shape is defined between the foot support member 236 and its corresponding frame member 230, 232, 234. However, in other embodiments, each foot support member 236 may have any other suitable shape.

Figure 8:
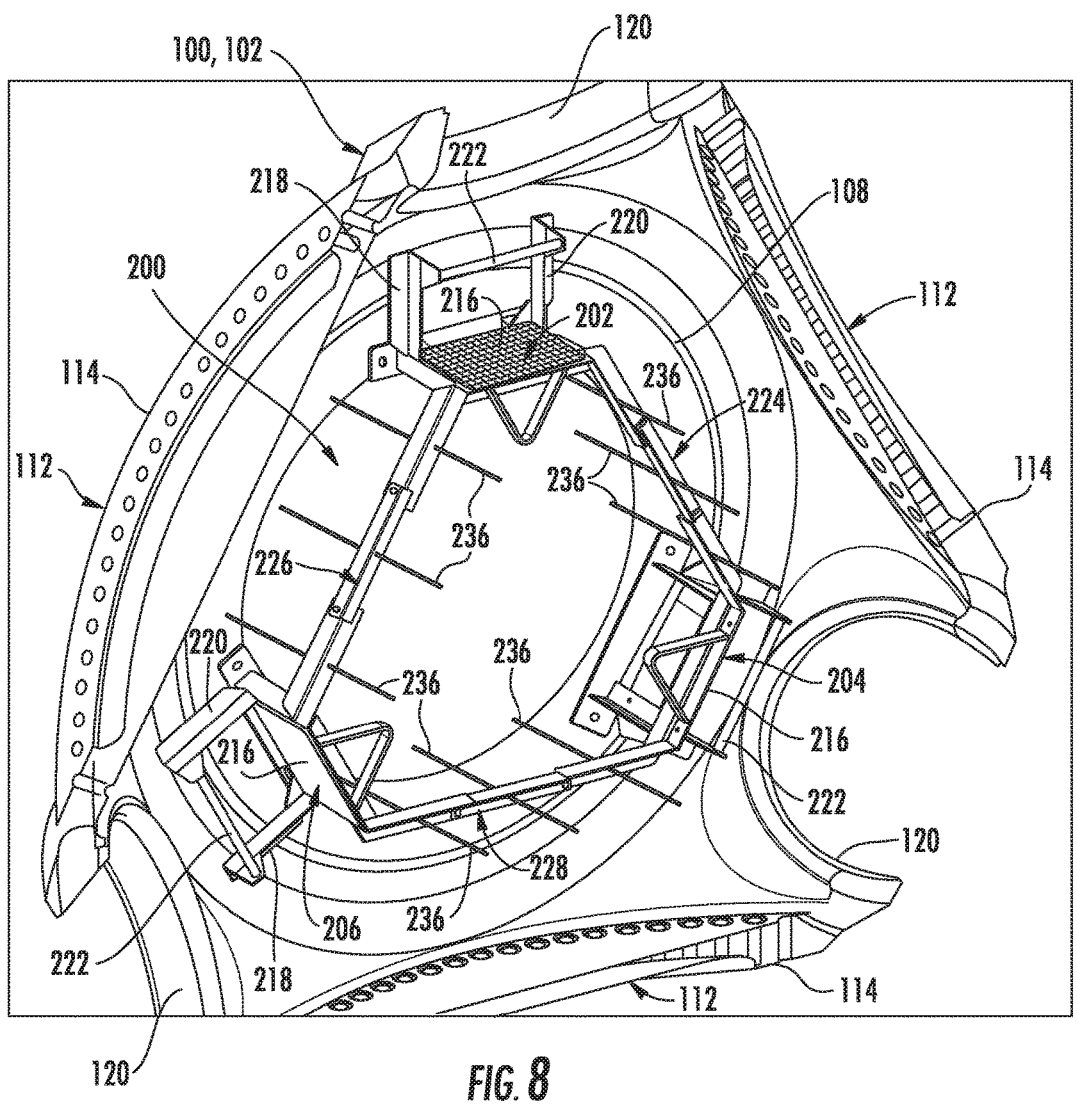
FIG. 8 illustrates a perspective, internal view of the rotor hub shown in FIG. 2 with a further embodiment of a ladder assembly installed therein in accordance with aspects of the present subject matter, particularly illustrating the ladder assembly including rung-like foot support members extending from the assembly's connecting frames.

In other embodiments, the foot support members 236 may be configured to extend from the frame member(s) 230, 232, 234 without defining closed-shapes therebetween. For instance, FIG. 8 illustrates an alternative embodiment in which the foot support members 236 are configured as ladder rungs or posts extending outwardly from the frame member(s) 230, 232, 234. As shown in FIG. 8, the foot support members 236 extend outwardly from the frame member(s) 230, 232, 234 in an axial direction of the rotor hub 100 (e.g., in a direction parallel to the rotational axis of the hub 100). Alternatively, the foot support members 236 may be configured to extend radially relative to frame member(s) 230, 232, 234, such as by extending radially inwardly and/or radially outwardly from the frame member(s) 230, 232, 234.

Referring back to FIGS. 3-6, as particularly shown in FIG. 6, each connecting frame 224, 226, 228 may be configured to extend lengthwise between its corresponding platforms 202, 204, 206 along a reference line 240. For example, in several embodiments, each connecting frame 224, 226, 228 may extend lengthwise along a reference line 240 that is oriented at a non-perpendicular angle relative to the planar surfaces 216 defined by the platforms 202, 204, 206 between which the connecting frame 224, 226, 228 is coupled. Specifically, in one embodiment, the reference line 240 for each connecting frame 224, 226, 228 may be oriented relative to the adjacent stepping platforms 202, 204, 206 such that an obtuse interior angle 242 is defined along the interior of the ladder assembly 200 at the intersection of each reference line 240 and the planar surface 216 defined by each platform 202, 204, 206. As a result, the connecting frames 224, 226, 228 coupled to a given platform 202, 204, 206 may diverge outwardly from one another as the connecting frames 224, 226, 228 extend from such platform 202, 204, 206 towards the adjacent platforms 202, 204, 206. It should be appreciated that the specific interior angles 242 defined between the reference lines 240 for the connecting frames 224, 226, 228 and the platforms 202, 204, 206 may generally vary depending on the installation locations and relative positioning of the platforms 202, 204, 206. However, in a particular embodiment, the platforms 202, 204, 206 may be installed within the rotor hub 100 (e.g., at locations around the circumference of the shaft opening 108) such that the reference line 240 defined by each connecting frame 224, 226, 228 extends generally parallel to the blade mounting plane or planar mounting surface 114 defined by the adjacent blade flange 112.

By positioning the platforms 202, 204, 206 relative to one another within the interior of the hub 100 such that each connecting frame 224, 226, 228 extends between adjacent platforms 202, 204, 206 at an obtuse interior angle 242, the ladder assembly 200 may define a significant amount of storage space or pass-through area. For example, as indicated by the dashed box 244 shown in FIG. 6, an internal area may be defined within the inner perimeter of the ladder assembly 200 that is formed by the radially inner ends of the foot support members 236. Such internal area 244 may be used for mounting and/or storing equipment and/or other wind turbine components. Additionally, due to the configuration of the disclosed ladder assembly 200, open spaces 246 may be defined within the interior of the rotor hub 100 between each connecting frame 224, 226, 228 and the adjacent blade flange 112 of the hub 100. Such open spaces 246 may provide sufficient room for positioning and/or manipulating tools and/or other devices relative to the adjacent blade flange 112. For example, the open spaces 246 may provide sufficient room for performing pitch bearing maintenance, such as by allowing tools for checking the pitch bearing bolts to be inserted between each connecting frame 224, 226, 228 and the adjacent blade flange 114.

In the illustrated embodiment, the reference lines 240 defined by the connecting frames 224, 226, 228 are shown as continuous straight lines. In another embodiment, each reference line 240 may be curved such that each connecting frame 224, 226, 228 extends lengthwise between its adjacent platforms 202, 204, 206 along a curved or arcuate path. Similarly, in a further embodiment, each reference line 240 may be non-straight lines, such as by defining one or more line segments that are angled relative to one or more other line segments of the reference line 240. Additionally, in the illustrated embodiment, the frame members 230, 232, 234 forming each connecting frame 224, 226, 228 are shown as extending along a common reference line 240. However, in other embodiments, one or more of the frame members 230, 232, 234 forming each connecting frame 224, 226, 228 may be configured to extend lengthwise along a reference line that differs from the reference line(s) associated with one or more of the other frame members 230, 232, 234 forming such connecting frame 224, 226, 228.

It should be appreciated that, in the embodiments illustrated herein, the ladder assembly 200 is shown as being contained entirely within the interior of the hub 100. However, in other embodiments, portions of the ladder assembly 200 may be configured to extend to the exterior of the hub 100. For instance, in one embodiment, each pair of ladder supports 218, 220 may be configured to extend radially from the corresponding platform 202, 204, 206 through the adjacent access port 120 to a location exterior of the hub 100. In such an embodiment, a plurality of ladder rungs 222 may be provided between the ladder supports 218, 220 to provide stepping surfaces for climbing down into the interior of the hub 100.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor hub for a wind turbine, the rotor hub comprising:
   a hub body extending between a forward end and an aft end, the hub body defining a plurality of blade flanges between the forward and aft ends, the hub body further defining a plurality of access ports spaced apart from the blade flanges, the hub body being rotatable about a rotational axis extending in an axial direction of the rotor hub; and
   a ladder assembly extending within an interior of the hub body, the ladder assembly comprising:
      first, second, and third ladder sub-assemblies, each of the first, second, and third ladder sub-assemblies being positioned within the interior of the rotor hub so as to be circumferentially aligned with a respective one of the plurality of access ports, each of the first, second, and third ladder sub-assemblies comprising:
         a platform defining a planar stepping surface extending in the axial direction of the rotor hub, the planar stepping surface defining an axial width in the axial direction:
         first and second ladder supports extending radially outwardly from the platform towards the respective one of the plurality of access ports; and
         a ladder rung extending between the first and second ladder supports so as to be spaced radially outwardly from the platform, the ladder rung defining a second stepping surface extending in the axial direction of the rotor hub, the second stepping surface defining a shorter axial width in the axial direction than the axial width of the planar stepping surface;
      a first connecting frame extending between the platforms of the first and second ladder sub-assemblies so as to couple the first and second ladder sub-assemblies to each other;
      a second connecting frame extending between the platforms of the first and third ladder sub-assemblies so as to couple the first and third ladder sub-assemblies to each other; and
      a third connecting frame extending between the platforms of the second and third ladder sub-assemblies so as to couple the second and third ladder sub-assemblies to each other,
      wherein each connecting frame of the first second, and third connecting frames extends lengthwise along a reference line,
      wherein the platforms of the first, second, and third ladder sub-assemblies are positioned relative to one another such that the reference line associated with each said connecting frame of the first, second, and third connecting frames is oriented at a non-perpendicular angle relative to the planar stepping surfaces defined by the platforms between which each said connecting frame extends;
      the rotor hub further defining a first vertical plane within which the ladder rungs reside, and a second vertical plane within which the connecting frames reside, wherein the second vertical plane is laterally offset from and parallel to the first vertical plane such that the rungs and the connecting frames are laterally offset from each other.

2. The rotor hub of claim 1, wherein each blade flange of the plurality of blade flanges defines a planar mounting surface for coupling a rotor blade of the wind turbine to the rotor hub, wherein the reference line along which each of the first, second, and third connecting frames extends is oriented parallel to the planar mounting surface defined by an adjacent blade flange of the plurality of blade flanges.

3. The rotor hub of claim 1, wherein the ladder assembly further comprises at least one foot support member extending outwardly from each of the first, second, and third connecting frames.

4. The rotor hub of claim 1, wherein the planar stepping surface is oriented generally perpendicular to a centerline of the respective one of the plurality of access ports.

5. The rotor hub of claim 1, wherein a foot support member extends radially inwardly from each one of said platforms respectively towards an interior of the ladder assembly, the foot support member having a different configuration than the ladder rung spaced radially outwardly from each one of said platforms respectively.

6. A rotor hub for a wind turbine, the rotor hub comprising:
   a hub body extending between a forward end and an aft end, the hub body defining a plurality of blade flanges between the forward and aft ends, the hub body further defining a plurality of access ports spaced apart from the blade flanges; and
   a ladder assembly extending within an interior of the hub body, the ladder assembly comprising:
      first, second, and third ladder sub-assemblies, each of the first second, and third ladder sub-assemblies being positioned at least partially within the interior of the rotor hub so as to be circumferentially aligned with a respective one of the plurality of access ports, each of the first, second, and third ladder sub-assemblies including;
         a first ladder support;
         a second ladder support;
         at least one ladder rung extending between the first and second ladder supports; and
         a platform, the first and second ladder supports extending radially outwardly from the platform towards the respective one of the plurality of access ports, the at least one ladder rung extending between the first and second ladder supports so as to be spaced radially outwardly from the platform;
      a first connecting frame extending between the first and second ladder sub-assemblies so as to couple the first and second ladder sub-assemblies to each other;
      a second connecting frame extending between the first and third ladder sub-assemblies so as to couple the first and third ladder sub-assemblies to each other;

a third connecting frame extending between the second and third ladder sub-assemblies so as to couple the second and third ladder sub-assemblies to each other; and first, second, and third foot support members extending from the first, second, and third connecting frames, respectively, wherein each foot support member of the first, second, and third foot support members has a cantilevered configuration and extends from its respective connecting frame of the first, second, and third connecting frames to a free end.

7. The rotor hub of claim 6, wherein each foot support member of the first, second, and third foot support members extends inwardly from its respective connecting frame of the first, second, and third connecting frames towards an interior of the ladder assembly.

8. The rotor hub of claim 6, wherein each foot support member of the first, second, and third foot support members extends outwardly from its respective connecting frame of the first second, and third connecting frames towards an exterior of the ladder assembly.

9. The rotor hub of claim 6, wherein each foot support member of the first, second, and third foot support members extends from its respective connecting frame of the first, second, and third connecting frames such that a closed shape is defined between each support member and its respective connecting frame.

10. The rotor hub of claim 6, wherein the platform defines a planar stepping surface extending in an axial direction of the rotor hub, the planar stepping surface defining an axial width in the axial direction, the ladder rung defining a second stepping surface extending in the axial direction of the rotor hub, the second stepping surface defining a shorter axial width in the axial direction than the axial width of the planar stepping surface.

11. The rotor hub of claim 10, wherein an auxiliary foot support member extends radially inwardly from the platform towards an interior of the ladder assembly, the auxiliary foot support member having a different configuration than the at least one ladder rung spaced radially outwardly from the platform.

* * * * *